No. 830,421. PATENTED SEPT. 4, 1906.
E. H. ELMORE.
REIN GUARD.
APPLICATION FILED AUG. 16, 1905.
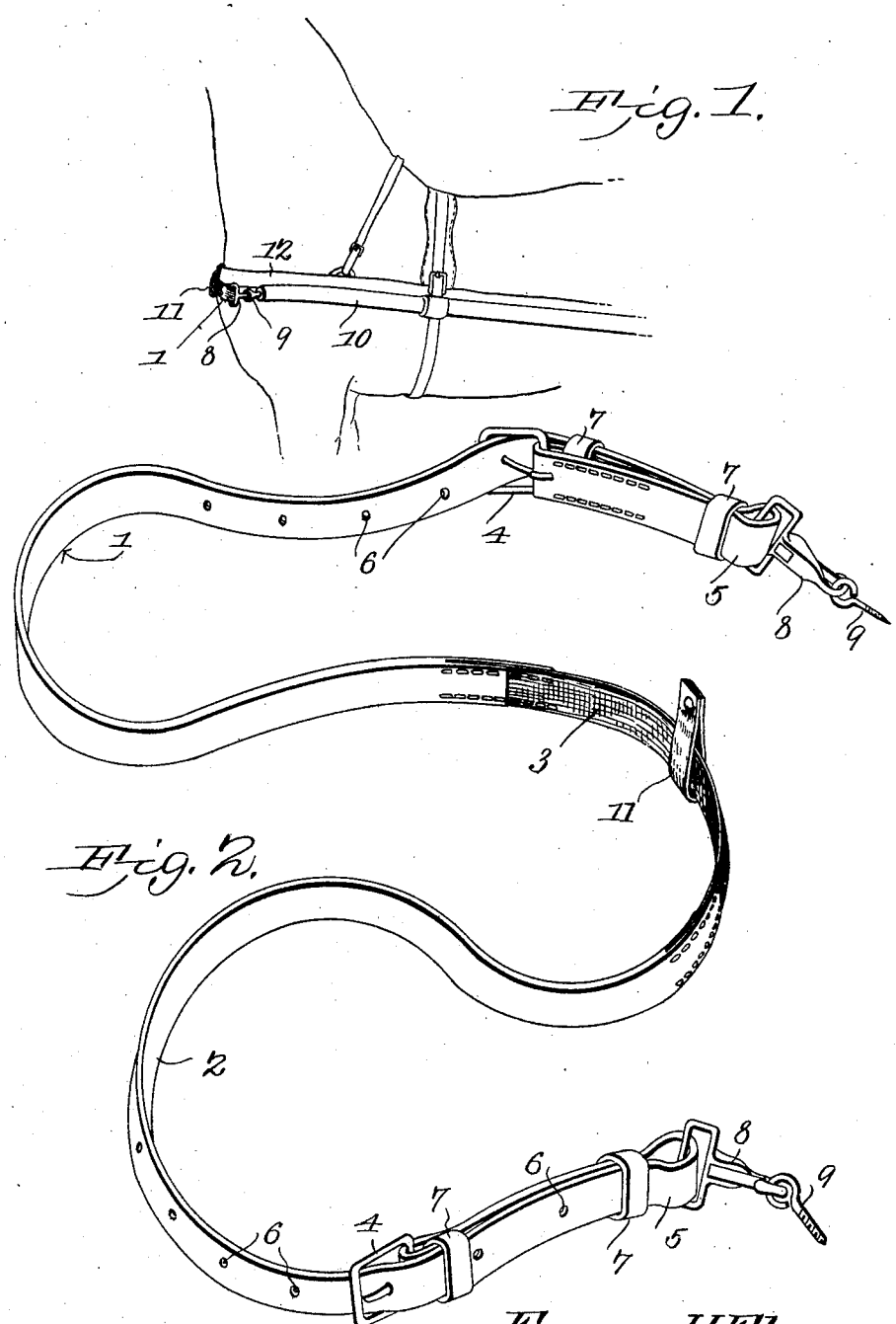
Witnesses
Eugene H. Elmore,
Inventor,
by C. A. Snow & Co.
Attorneys

UNITED STATES PATENT OFFICE.

EUGENE H. ELMORE, OF LITCHFIELD, MICHIGAN.

REIN-GUARD.

No. 830,421.  Specification of Letters Patent.  Patented Sept. 4, 1906.

Application filed August 16, 1905. Serial No. 274,450.

*To all whom it may concern:*

Be it known that I, EUGENE H. ELMORE, a citizen of the United States, residing at Litchfield, in the county of Hillsdale and State of Michigan, have invented a new and useful Rein-Guard, of which the following is a specification.

This invention relates to rein-guards, and has for its object to provide an improved device of this character designed for preventing the reins from becoming caught beneath the front ends of the thills. It is also proposed to enable the convenient application and removal of the device and to construct the same so as not to interfere with the animal nor to require any change or alteration in the harness and the thills.

With these and other objects in view the present invention consists in the combination and arrangement of parts, as will be hereinafter more fully described, shown in the accompanying drawings, and particularly pointed out in the appended claim, it being understood that changes in the form, proportion, size, and minor details may be made within the scope of the claim without departing from the spirit of sacrificing any of the advantages of the invention.

In the accompanying drawings, Figure 1 is a side elevation showing the present rein-guard in its operative position. Fig. 2 is a perspective view of the rein-guard of the present invention.

Like characters of reference designate corresponding parts in each figure of the drawings.

The present rein-guard includes two duplicate strap members 1 and 2, preferably of leather, and connected by an elastic strap or web 3. The free end of each strap is provided with a buckle 4, and said free end is folded back upon the inner side of the strap to form a loop 5, the strap being provided with a series of perforations 6, with which the tongue of the buckle is engaged, so as to hold said buckle at any position upon the strap to adjust the size of the loop, and thereby adjust the working length of the strap. Suitable guard-loops 7 embrace the looped portion 5 of the strap, so as to hold the opposite portions of the strap close together, and thereby prevent undue looseness of the snap-hook 8, which is carried by the outer end of the loop 5. The rein-guard is completed by means of two screw-eyes 9, one for each snap-hook.

In practice each screw-eye is fitted into the forward end of a thill—such, for instance, as designated at 10 in Fig. 1 of the drawings—one of the snap-hooks being engaged with each of the screw-eyes, so as to support the device transversely across the space between the thills. Prior to engaging the device with the thills one end of the strap is passed through a loop 11, provided upon the front of the breast-collar 12 of the harness, whereby the intermediate portion of the device is held in its proper position and prevented from sagging down beneath the thills. When the present device is in position, it presents a barrier extending across the space between the front ends of the thills, so as to support the reins and prevent the same from dropping down below and becoming caught beneath the thills.

The purpose of the elastic connection 3 is to permit the necessary stretching of the device under the influence of the movement of the animal beyond the ends of the thills, thereby to prevent any binding across the chest of the animal.

From the foregoing description it will be understood that the device of the present invention is exceedingly simple and effective for the purpose designed and may be conveniently fitted in place without requiring any change or alteration in the thills and in the harness beyond the provision of the loop 11 upon the breast-collar. Moreover, when the device is in position it does not interfere with the animal, and in taking the animal out of the thills it is merely necessary to release the snap-hooks from the eyes 9, the device being held upon the harness by means of the loop 11, wherefore the rein-guard is always in readiness to be snapped upon the thills when the animal is being hitched up.

While I have hereinbefore explained that one end of the guard is passed through the loop 11 preparatory to engaging the snap-hooks with the screw-eyes, it is also proposed to have the loop 11 fitted to the guard in the original manufacture thereof in order that the device may be placed upon the market in its complete form, the loop 11 being afterward stitched or otherwise secured to the breast-collar of a harness.

Having thus described the invention, what is claimed is—

A rein-guard comprising a strap having an intermediate elastic portion, a loop loosely embracing the middle portion of the strap and extending beyond the latter for connection with a breast-collar, buckles carried by the ends of the strap, each end of the strap having a series of perforations and also folded back upon itself with the tongue of the buckle received in one of the perforations to form an adjustable loop upon the end of the strap, snap-hooks carried by the loops, and screw-eyes carried by the snap-hooks.

In testimony that I claim the foregoing as my own I have hereto affixed my signature in the presence of two witnesses.

EUGENE H. ELMORE.

Witnesses:
  JOSIAH B. HADLEY,
  IVA M. BUEL.